(12) United States Patent
McNeill

(10) Patent No.: US 10,526,776 B1
(45) Date of Patent: Jan. 7, 2020

(54) TEMPORARY STORM WATER STORAGE SYSTEM

(71) Applicant: Leonard McNeill, Hanahan, SC (US)

(72) Inventor: Leonard McNeill, Hanahan, SC (US)

( * ) Notice: Subject to any disclaimer, the term of this patent is extended or adjusted under 35 U.S.C. 154(b) by 0 days.

(21) Appl. No.: 16/525,685

(22) Filed: Jul. 30, 2019

(51) Int. Cl.
  *E03F 1/00* (2006.01)
  *E03F 5/10* (2006.01)
  *F04D 13/06* (2006.01)
  *B65D 88/78* (2006.01)

(52) U.S. Cl.
  CPC .............. *E03F 1/002* (2013.01); *E03F 5/101* (2013.01); *B65D 88/78* (2013.01); *E03F 1/00* (2013.01); *F04D 13/06* (2013.01)

(58) Field of Classification Search
  CPC ........................................................ E03F 1/00
  USPC .......... 405/36, 39–41, 52; 210/747.2, 170.03
  See application file for complete search history.

(56) References Cited

U.S. PATENT DOCUMENTS

| 536,858 | A | 4/1895 | Donato |
|---|---|---|---|
| 3,736,619 | A | 6/1973 | Zamboni |
| 3,957,402 | A | 5/1976 | Sloan |
| 4,260,334 | A | 4/1981 | Kelley |
| 4,632,643 | A | 12/1986 | Nielsen |
| 7,503,725 | B1 | 3/2009 | Pratt |
| D623,201 | S | 9/2010 | Yu |

FOREIGN PATENT DOCUMENTS

JP  2004-169523 A  *  6/2004

* cited by examiner

*Primary Examiner* — Sunil Singh
(74) *Attorney, Agent, or Firm* — Kyle A. Fletcher, Esq.

(57) ABSTRACT

The temporary storm water storage system comprises a storage tank, an inlet pump, an outlet pump, a graded top drain, a plurality of sensors, a timer, a first valve, a second valve, and a plurality of interconnecting pipes. The temporary storm water storage system may pump flood water from a street into the storage tank when flooding is detected by the plurality of sensors. The temporary storm water storage system may pump the flood water from the storage tank into the street after a predetermined time interval once the flooding has subsided. The flood water pumped from the storage tank to the street may be drained from the street via one or more catch basins into a storm drain.

20 Claims, 3 Drawing Sheets

TEMPORARY STORM WATER STORAGE SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of storm water retention, more specifically, a temporary storm water storage system.

SUMMARY OF INVENTION

The temporary storm water storage system comprises a storage tank, an inlet pump, an outlet pump, a graded top drain, a plurality of sensors, a timer, a first valve, a second valve, and a plurality of interconnecting pipes. The temporary storm water storage system may pump flood water from a street into the storage tank when flooding is detected by the plurality of sensors. The temporary storm water storage system may pump the flood water from the storage tank into the street after a predetermined time interval once the flooding has subsided. The flood water pumped from the storage tank to the street may be drained from the street via one or more catch basins into a storm drain.

An object of the invention is to temporarily store flood water from a street in a tank and release the flood water back to the street when flooding has subsided.

Another object of the invention is to pump the flood water from a graded top drain on the crown of the street into the tank when sensors indicate that the street is flooded.

A further object of the invention is to pump the flood water out of the tank and back into the street via the top graded drain when sensors indicate that flooding has subsided.

Yet another object of the invention is to provide a timer to introduce a predetermined time interval between the detection that flooding has subsided and the release of flood water from the tank.

These together with additional objects, features and advantages of the temporary storm water storage system will be readily apparent to those of ordinary skill in the art upon reading the following detailed description of the presently preferred, but nonetheless illustrative, embodiments when taken in conjunction with the accompanying drawings.

In this respect, before explaining the current embodiments of the temporary storm water storage system in detail, it is to be understood that the temporary storm water storage system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the temporary storm water storage system.

It is therefore important that the claims be regarded as including such equivalent construction insofar as they do not depart from the spirit and scope of the temporary storm water storage system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
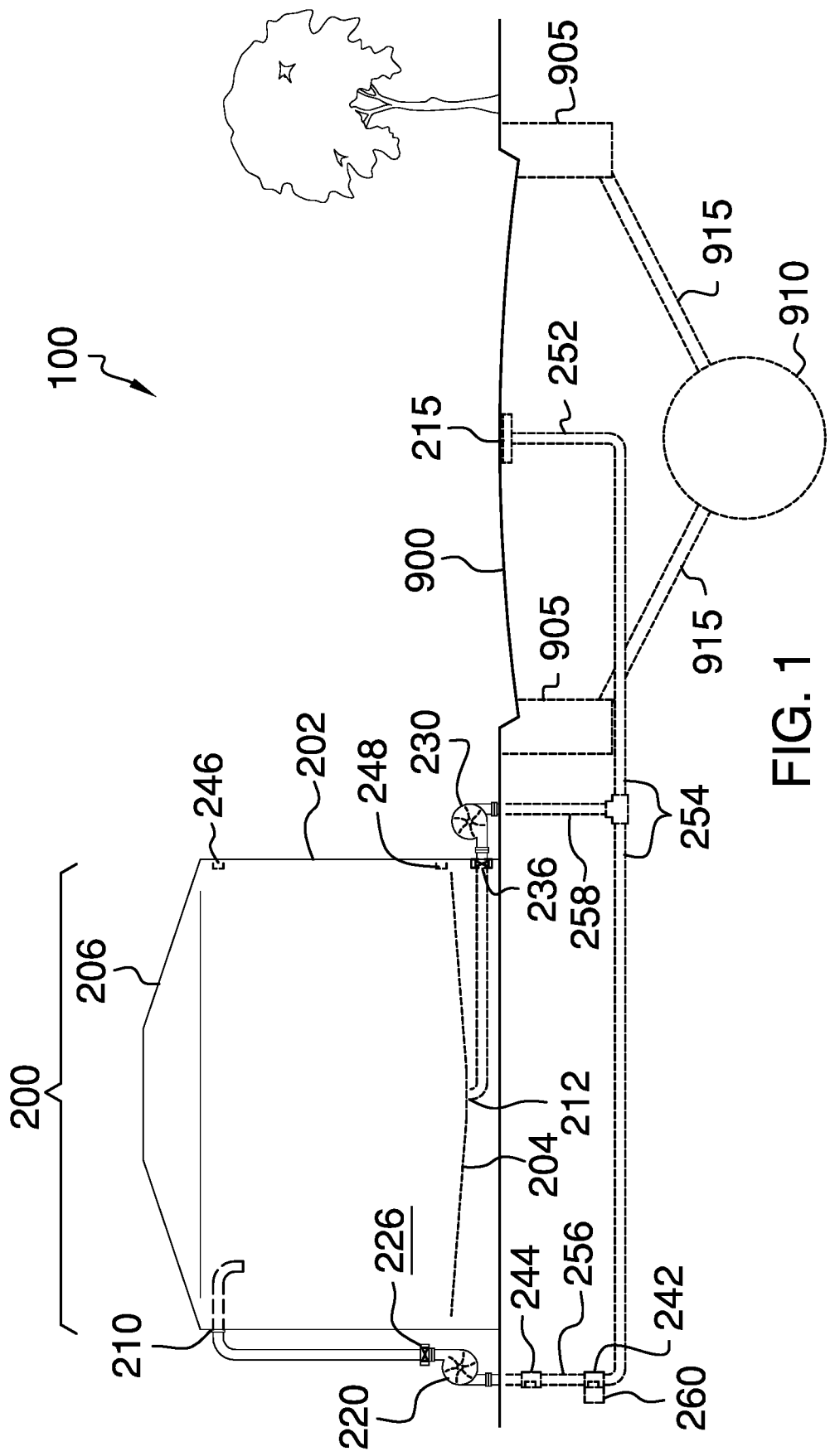
FIG. 1 is a front view of an embodiment of the disclosure illustrating the system during dry weather conditions.
Figure 2:
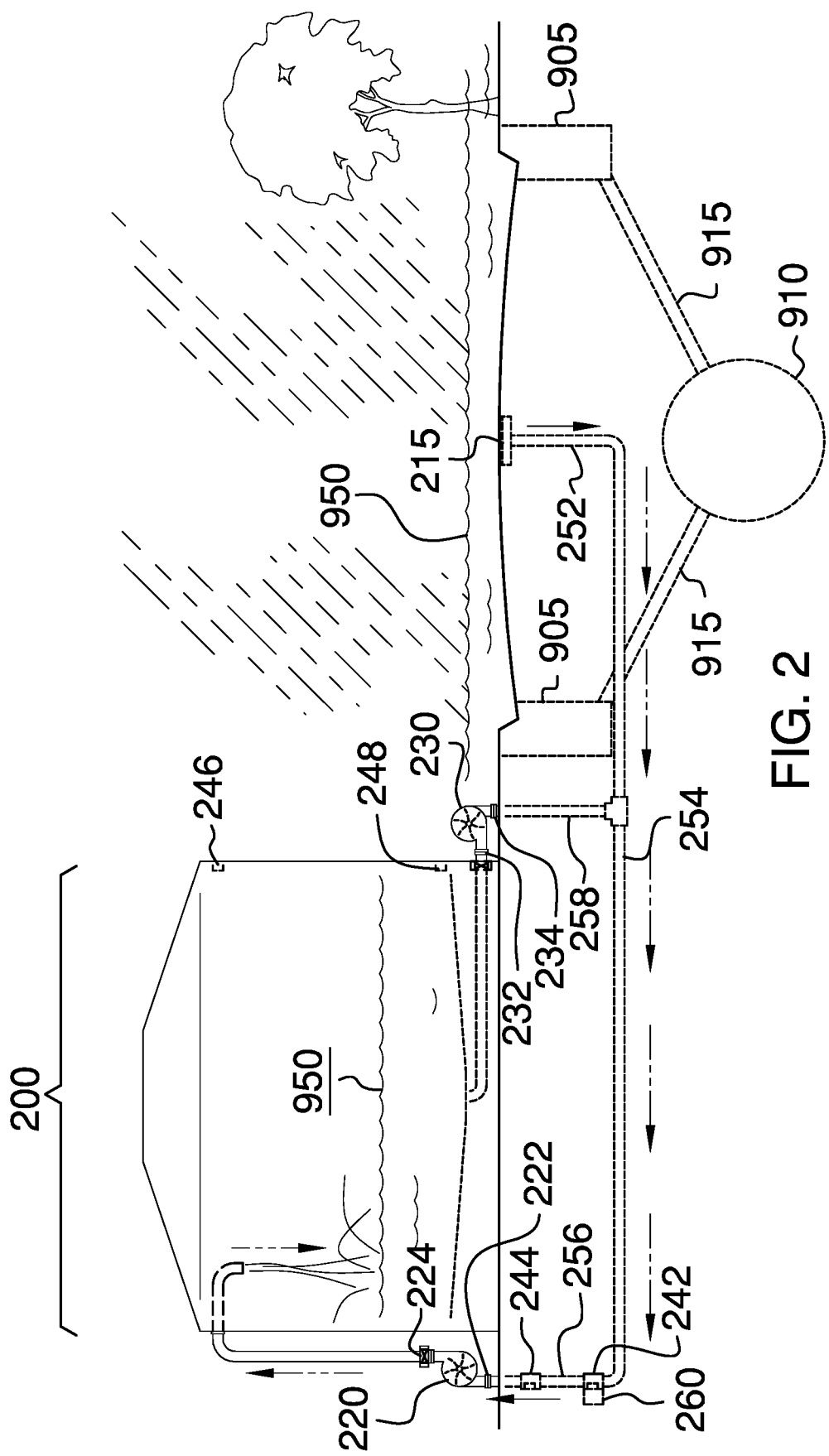
FIG. 2 is a front detail view of an embodiment of the disclosure illustrating the system pumping flood water into the tank.
Figure 3:
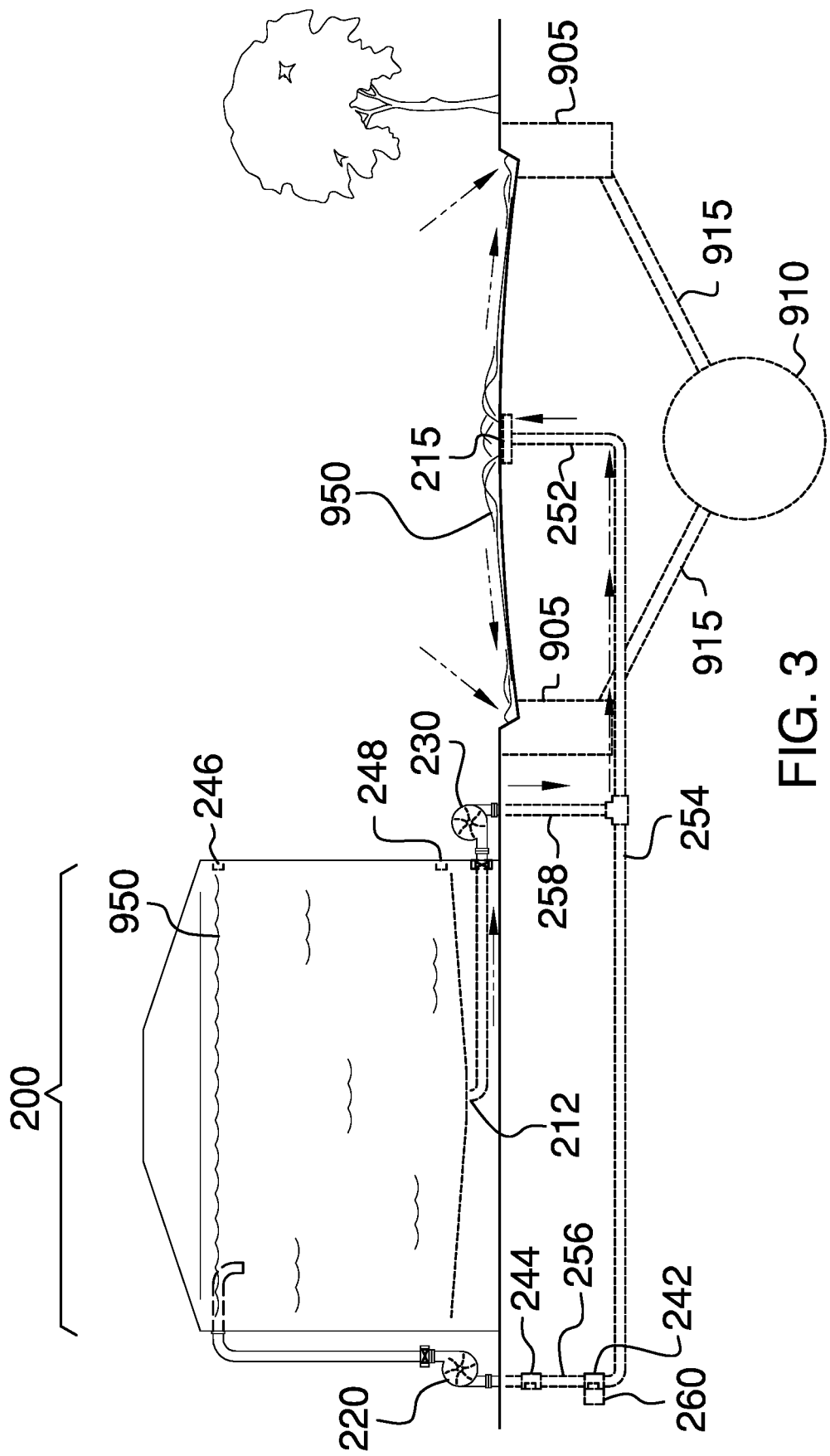
FIG. 3 is a front detail view of an embodiment of the disclosure illustrating the system pumping flood water out of the tank.

Detailed reference will now be made to a first potential embodiment of the disclosure, which is illustrated in FIGS. 1 through 3.

The temporary storm water storage system 100 (hereinafter invention) comprises a storage tank 200, an inlet pump 220, an outlet pump 230, a graded top drain 215, a plurality of sensors, a timer 260, a first valve 226, a second valve 236, and a plurality of interconnecting pipes. The invention 100 may pump flood water 950 from a street 900 into the storage tank 200 when flooding is detected by the plurality of sensors. The invention 100 may pump the flood water 950 from the storage tank 200 into the street 900 after a predetermined time interval once the flooding has subsided. The flood water 950 pumped from the storage tank 200 to the street 900 may be drained from the street 900 via one or more catch basins 905 into a storm drain 910.

The storage tank 200 may be a container for holding the flood water 950. The storage tank 200 may comprise a tank wall 202, a tank bottom 204, a tank top 206, a tank inlet 210, and a tank drain 212. The tank wall 202 may surround the container. The tank top 206 may be coupled to the top of the tank wall 202 and the tank bottom 204 may be coupled to the bottom of the tank wall 202. The tank wall 202, the tank top 206, the tank bottom 204 and the couplings there between may be watertight such that the flood water 950 in the storage tank 200 does not leak from the storage tank 200. The tank inlet 210 may be an aperture that is coupled to an inlet pipe 256. The flood water 950 may be introduced into the storage tank 200 via the tank inlet 210. The tank drain 212 may be an aperture located in the tank bottom 204 through which the storage tank 200 may be emptied. The tank drain 212 may be coupled to an outlet pipe 258. In some embodiments, the tank bottom 204 may slope towards the tank drain 212 such that all of the flood water 950 in the storage tank 200 may be drained.

The inlet pump 220 may move the flood water 950 from an inlet pump intake port 222 to an inlet pump discharge port 224. The inlet pump 220 may be electromechanical and may comprise an internal motor that may be energized by the application of an inlet pump activation potential to the inlet pump 220. As non-limiting examples, the inlet pump 220 may move the flood water 950 by applying rotary motion, reciprocating motion, linear motion, or a combination thereof to one or more gears, screws, pistons, shuttle blocks, vanes, diaphragms, plungers, chains, ropes, impellers, or combinations thereof. The inlet pump 220 may be in line with the inlet pipe 256 such that the inlet pump 220 may pump the flood water 950 supplied by the graded top drain 215 and a street drain pipe 252 into the storage tank 200. The flood water 950 entering the graded top drain 215 may thus be pumped by the inlet pump 220 into the storage tank 200.

The outlet pump 230 may move the flood water 950 from an outlet pump intake port 232 to an outlet pump discharge port 234. The outlet pump 230 may be electromechanical and may comprise an internal motor that may be energized by the application of an outlet pump activation potential to the outlet pump 230. As non-limiting examples, the outlet pump 230 may move the flood water 950 by applying rotary motion, reciprocating motion, linear motion, or a combination thereof to one or more gears, screws, pistons, shuttle blocks, vanes, diaphragms, plungers, chains, ropes, impellers, or combinations thereof. The outlet pump 230 may be in line with the outlet pipe 258 such that the outlet pump 230 may pump the flood water 950 held in the storage tank 200 into the street drain pipe 252 and up to the graded top drain 215. The flood water 950 held in the storage tank 200 may thus be pumped back onto the street 900 via the graded top drain 215 where it may flow to the one or more catch basins 905.

The graded top drain 215 may be a grate that is coupled to the street 900 at a crown 920 of the street 900 such that the graded top drain 215 is flush with the street 900. The graded top drain 215 may be coupled to the street drain pipe 252 such that the flood water 950 that enters the graded top drain 215 may flow to the inlet pipe 256 via the street drain pipe 252. When the flood water 950 accumulates on the street 900 faster than the one or more catch basins 905 can direct the flood water 950 away from the street 900, the flood water 950 may rise above the street 900 and may enter the graded top drain 215.

The plurality of sensors may comprise a first water sensor 242, a second water sensor 244, a third water sensor 246, and a fourth water sensor 248. The plurality of sensors may control, either directly or indirectly, the energization and de-energization of the inlet pump 220 and the outlet pump 230 by determining when the inlet pump activation potential and the outlet pump activation potential are applied to and removed from the inlet pump 220 and the outlet pump 230, respectively. The first water sensor 242 may be located at the bottom of the inlet pipe 256 adjacent to a lateral feed pipe 254. The first water sensor 242 may detect that the flood water 950 is in the street drain pipe 252. Since the flood water 950 in the plurality of interconnecting pipes will rise to the same level within the inlet pipe 256, the outlet pipe 258, and the street drain pipe 252 such that hydrostatic equilibrium is achieved, if any of the flood water 950 fills the bottom portion of the street drain pipe 252 then the flood water 950 will also fill the bottom portion of the inlet pipe 256. The second water sensor 244 may be located on the inlet pipe 256 at a height corresponding to the top of the one or more catch basins 905. The second water sensor 244 may detect that the flood water 950 has risen to a level that fills the one or more catch basins 905. The third water sensor 246 may be located inside the storage tank 200 at the top of the tank wall 202. The third water sensor 246 may detect that the storage tank 200 is full. The fourth water sensor 248 may be located inside the storage tank 200 at the bottom of the tank wall 202. The fourth water sensor 248 may detect when the storage tank 200 is empty.

The timer 260 may be electrically coupled between the first water sensor 242 and the outlet pump 230. The timer 260 may delay the operation of the outlet pump 230 by the predetermined time interval after a change in state of the first water sensor 242. The predetermined time interval may allow the one or more catch basins 905 to empty as the flood water 950 drains from the one or more catch basins 905 through storm laterals 915 into the storm drain 910.

The first valve 226 may be a one-way valve that permits the flood water 950 to enter the storage tank 200 via the inlet pipe 256 but prevents the flood water 950 from backflowing through the inlet pipe 256. The second valve 236 may be a one-way valve that permits the flood water 950 to exit the storage tank 200 via the outlet pipe 258 but prevents the flood water 950 from entering the storage tank 200 via the outlet pipe 258.

The plurality of interconnecting pipes may comprise the street drain pipe 252, the lateral feed pipe 254, the inlet pipe 256, and the outlet pipe 258. The plurality of interconnecting pipes may direct the flow of the flood water 950 from the graded top drain 215 into the storage tank 200 via the inlet pump 220 and from the storage tank 200 out of the graded top drain 215 via the outlet pipe 258. The street drain pipe 252 may be a vertically oriented pipe that couples the graded top drain 215 to the lateral feed pipe 254. The lateral feed pipe 254 may couple the street drain pipe 252 to the inlet pipe 256 and to the outlet pipe 258. The inlet pipe 256 may couple the lateral feed pipe 254 to the tank inlet 210. The flood water 950 passing into the storage tank 200 via the inlet pipe 256 may pass through the inlet pump 220. The outlet pipe 258 may couple the tank drain 212 to the lateral feed pipe 254. The flood water 950 passing out of the storage tank 200 via the inlet pipe 256 may pass through the outlet pump 230.

The inlet pump 220 may be energized when the flood water 950 within the plurality of interconnecting pipes reaches the second water sensor 244. When the flood water 950 reaches the second water sensor 244 it may indicate that the one or more catch basins 905 are full and that the street 900 is flooded.

The inlet pump 220 may be de-energized when the third water sensor 246 indicates that the storage tank 200 is full, when the flood water 950 in the plurality of interconnecting pipes has dropped below the height of the first water sensor 242 as indicated by the first water sensor 242, or combinations thereof. When the flood water 950 drops below the height of the first water sensor 242 it may indicate that the plurality of interconnecting pipes are near empty.

The outlet pump 230 may be energized after the predetermined time interval following the timer 260 being triggered by an indication from the first water sensor 242 that the flood water 950 has been pumped out of the plurality of interconnecting pipes.

The outlet pump 230 may be de-energized when the fourth water sensor 248 indicates that the storage tank 200 is empty.

In some embodiments, the inlet pump 220 and the outlet pump 230 may be manually energized, manually de-energized, or both using override switches that are electrically coupled to the inlet pump 220, to the outlet pump 230, or to both.

As non-limiting examples, the first water sensor 242, the second water sensor 244, the third water sensor 246, the fourth water sensor 248, the override switches, or combinations thereof may be electrical components comprising one or more sets of electrical contacts. The first water sensor 242, the second water sensor 244, the third water sensor 246, the fourth water sensor 248, the override switches, or combinations thereof may start and stop the flow of electricity by touching or separating the electrical contacts, thus completing or interrupting an electric circuit. The first water sensor 242, the second water sensor 244, the third water sensor 246, the fourth water sensor 248, the override switches, or combinations thereof may be normally open, normally closed, single throw, double through, may comprise a center-off position, or combinations thereof.

In some embodiments, the first valve 226, the second valve 236, or both may be electrically operated. The first valve 226 may be electrically opened whenever the inlet pump 220 is energized. The second valve 236 may be electrically opened whenever the outlet pump 230 is energized.

In use, the flood water 950 may fill the one or more catch basins 905 to overflowing. The flood water 950 may fill the street 900 and begin to flow into the graded top drain 215. When the flood water 950 fills the plurality of interconnecting pipes and reaches the second water sensor 244, the inlet pump 220 may be energized to move the flood water 950 from the plurality of interconnecting pipes into the storage tank 200.

Eventually a point may be reached where the flood water 950 no longer flows into the graded top drain 215 and the inlet pump 220 empties the plurality of interconnecting pipes. The first water sensor 242 may signal the timer 260 that the plurality of interconnecting pipes are empty and the timer 260 may begin to time the predetermined time interval. At the end of the predetermined time interval, the outlet pump 230 may be energized by the timer 260 and may begin to pump the flood water 950 out of the storage tank 200 via the tank drain 212 and into the plurality of interconnecting pipes. The flood water 950 may be forced through the plurality of interconnecting pipes to the graded top drain 215 where the flood water 950 may begin to flow back into the street 900. The flood water 950 may flow from the graded top drain 215 into the one or more catch basins 905 where it may be collected and pass to the storm drain 910 via the storm laterals 915. The outlet pump 230 may be de-energized when the fourth water sensor 248 indicates that the storage tank 200 is empty.

During unusually long periods of heavy rain, where the storage tank 200 may be filled before the street 900 is clear of water, the third water sensor 246 may detect that the storage tank 200 is full and may de-energize the inlet pump 220 to prevent potential damage to the storage tank 200 or the inlet pump 220.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used herein, "energize" and/or "energization" refer to the application of an electrical potential to a system or subsystem.

As used in this disclosure, the term "flush" is used to describe that a first surface is aligned with a second surface.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "grate" is a plurality of parallel metal bars or a metal structure comprising a mesh structure formed from metal bars.

As used in this disclosure, the word "lateral" refers to the sides of an object or movement towards a side. Lateral directions are generally perpendicular to longitudinal directions. "Laterally" refers to movement in a lateral direction.

As used in this disclosure, a "motor" refers to a device that transforms energy from an external power source into mechanical energy.

As used in this disclosure, a "pipe" is a hollow cylindrical device that is used for transporting liquids and/or gases or for structural purposes. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

As used in this disclosure, a "pump" is a mechanical or electromechanical device that uses suction or pressure to raise or move fluids, compress fluids, or force a fluid into an inflatable object. As non-limiting examples, fluids may include both liquids, such as water, and gases, such as air.

As used in this disclosure, a "sensor" is a device that quantitatively measures a physical stimulus.

As used in this disclosure, a "valve" is a device that is used to control the flow of a fluid, either gas or liquid, through a pipe or to control the flow of a fluid into and out of a container. Some valves may have multiple ports and may allow the diverting or mixing of fluids.

As used in this disclosure, "vertical" refers to a direction that is parallel to the local force of gravity. Unless specifically noted in this disclosure, the vertical direction is always perpendicular to horizontal.

As used herein, the word "watertight" refers to a barrier that is impermeable to water.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A temporary storm water storage system comprising:
   a storage tank, an inlet pump, an outlet pump, a graded top drain, a plurality of sensors, a timer, a first valve, a second valve, and a plurality of interconnecting pipes;
   wherein the temporary storm water storage system pumps flood water from a street into the storage tank when flooding is detected by the plurality of sensors;
   wherein the temporary storm water storage system pumps the flood water from the storage tank into the street after a predetermined time interval once the flooding has subsided;
   wherein the flood water pumped from the storage tank to the street is drained from the street via one or more catch basins into a storm drain.

2. The temporary storm water storage system according to claim 1
   wherein the storage tank is a container for holding the flood water;
   wherein the storage tank comprises a tank wall, a tank bottom, a tank top, a tank inlet, and a tank drain;
   wherein the tank wall surrounds the container;
   wherein the tank top is coupled to the top of the tank wall and the tank bottom is coupled to the bottom of the tank wall;
   wherein the tank wall, the tank top, the tank bottom and couplings therebetween are watertight such that the flood water in the storage tank does not leak from the storage tank;
   wherein the tank inlet is an aperture that is coupled to an inlet pipe;
   wherein the flood water is introduced into the storage tank via the tank inlet;
   wherein the tank drain is an aperture located in the tank bottom through which the storage tank is emptied;
   wherein the tank drain is coupled to an outlet pipe;
   wherein the plurality of interconnecting pipes includes the inlet pipe and the outlet pipe.

3. The temporary storm water storage system according to claim 2
   wherein the tank bottom slopes towards the tank drain such that all of the flood water in the storage tank is drained through the tank drain.

4. The temporary storm water storage system according to claim 2
   wherein the inlet pump moves the flood water from an inlet pump intake port to an inlet pump discharge port.

5. The temporary storm water storage system according to claim 4
   wherein the inlet pump moves the flood water by applying rotary motion, reciprocating motion, linear motion, or a combination thereof to one or more gears, screws, pistons, shuttle blocks, vanes, diaphragms, plungers, chains, ropes, impellers, or combinations thereof.

6. The temporary storm water storage system according to claim 4
   wherein the inlet pump is in line with the inlet pipe such that the inlet pump pumps the flood water supplied by the graded top drain and a street drain pipe into the storage tank;
   wherein the flood water entering the graded top drain is thus pumped by the inlet pump into the storage tank;
   wherein the plurality of interconnected pipes includes the street drain pipe.

7. The temporary storm water storage system according to claim 6
   wherein the outlet pump moves the flood water from an outlet pump intake port to an outlet pump discharge port.

8. The temporary storm water storage system according to claim 7
   wherein the outlet pump moves the flood water by applying rotary motion, reciprocating motion, linear motion, or a combination thereof to one or more gears, screws, pistons, shuttle blocks, vanes, diaphragms, plungers, chains, ropes, impellers, or combinations thereof.

9. The temporary storm water storage system according to claim 7
   wherein the outlet pump is in line with the outlet pipe such that the outlet pump pumps the flood water held in the storage tank into the street drain pipe and up to the graded top drain;
   wherein the flood water held in the storage tank is thus pumped back onto the street via the graded top drain where it flows to the one or more catch basins.

10. The temporary storm water storage system according to claim 9
    wherein the graded top drain is a grate that is coupled to the street at a crown of the street such that the graded top drain is flush with the street;
    wherein the graded top drain is coupled to the street drain pipe such that the flood water that enters the graded top drain flows to the inlet pipe via the street drain pipe.

11. The temporary storm water storage system according to claim 10
    wherein when the flood water accumulates on the street faster than the one or more catch basins can direct the flood water away from the street, the flood water rises above the street and enters the graded top drain.

12. The temporary storm water storage system according to claim 11
    wherein the plurality of sensors comprises a first water sensor, a second water sensor, a third water sensor, and a fourth water sensor;

wherein the plurality of sensors control, either directly or indirectly, the energization and de-energization of the inlet pump and the outlet pump by determining when the inlet pump activation potential and the outlet pump activation potential are applied to and removed from the inlet pump and the outlet pump, respectively;

wherein the first water sensor is located at the bottom of the inlet pipe adjacent to a lateral feed pipe;

wherein the first water sensor detects that the flood water is in the street drain pipe;

wherein the second water sensor is located on the inlet pipe at a height corresponding to the top of the one or more catch basins;

wherein the second water sensor detects that the flood water has risen to a level that fills the one or more catch basins;

wherein the third water sensor is located inside the storage tank at the top of the tank wall;

wherein the third water sensor detects that the storage tank is full;

wherein the fourth water sensor is located inside the storage tank at the bottom of the tank wall;

wherein the fourth water sensor detects when the storage tank is empty.

13. The temporary storm water storage system according to claim 12
wherein the timer is electrically coupled between the first water sensor and the outlet pump;
wherein the timer delays the operation of the outlet pump by a predetermined time interval.

14. The temporary storm water storage system according to claim 13
wherein the first valve is a one-way valve that permits the flood water to enter the storage tank via the inlet pipe but prevents the flood water from backflowing through the inlet pipe;
wherein the second valve is a one-way valve that permits the flood water to exit the storage tank via the outlet pipe but prevents the flood water from entering the storage tank via the outlet pipe.

15. The temporary storm water storage system according to claim 14
wherein the plurality of interconnecting pipes comprises the street drain pipe, the lateral feed pipe, the inlet pipe, and the outlet pipe;

wherein the plurality of interconnecting pipes direct the flow of the flood water from the graded top drain into the storage tank via the inlet pump and from the storage tank out to the graded top drain via the outlet pipe;

wherein the street drain pipe is a vertically oriented pipe that couples the graded top drain to the lateral feed pipe;

wherein the lateral feed pipe couples the street drain pipe to the inlet pipe and to the outlet pipe;

wherein the inlet pipe couples the lateral feed pipe to the tank inlet;

wherein the flood water passing into the storage tank via the inlet pipe passes through the inlet pump;

wherein the outlet pipe couples the tank drain to the lateral feed pipe;

wherein the flood water passing out of the storage tank via the outlet pipe passes through the outlet pump.

16. The temporary storm water storage system according to claim 15
wherein the inlet pump is energized when the flood water within the plurality of interconnecting pipes reaches the second water sensor.

17. The temporary storm water storage system according to claim 16
wherein the inlet pump is de-energized when the third water sensor indicates that the storage tank is full.

18. The temporary storm water storage system according to claim 17
wherein the outlet pump is energized after the predetermined time interval following the timer being triggered by an indication from the first water sensor that the flood water has been pumped out of the plurality of interconnecting pipes.

19. The temporary storm water storage system according to claim 18
wherein the outlet pump is de-energized when the fourth water sensor indicates that the storage tank is empty.

20. The temporary storm water storage system according to claim 19
wherein the first valve, the second valve, or both are electrically operated;
wherein the first valve is electrically opened whenever the inlet pump is energized;
wherein the second valve is electrically opened whenever the outlet pump is energized.

* * * * *